(12) United States Patent
Takeda et al.

(10) Patent No.: US 6,462,299 B1
(45) Date of Patent: Oct. 8, 2002

(54) METHOD OF JOINING STRIPS IN A STEEL STRIP CONTINUOUS PROCESSING LINE

(75) Inventors: Akimichi Takeda; Masaru Yoshida; Akio Inoue, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 24 days.

(21) Appl. No.: 09/721,634

(22) Filed: Nov. 27, 2000

(30) Foreign Application Priority Data

May 25, 2000 (JP) ........................................ 2000-154639

(51) Int. Cl.⁷ .......................... B23K 26/20; B23K 31/02
(52) U.S. Cl. ............................ 219/121.14; 219/121.64; 219/128
(58) Field of Search ................ 219/121.63, 121.64, 219/121.13, 121.14, 137 R, 128; 228/155, 158, 232

(56) References Cited

U.S. PATENT DOCUMENTS

| 5,142,763 | A | * | 9/1992 | Toya et al. ................... 385/99 |
| 5,871,138 | A | * | 2/1999 | Shishido et al. ............. 228/102 |
| 5,900,079 | A | * | 5/1999 | Ono et al. .............. 219/121.64 |
| 6,340,108 | B1 | * | 1/2002 | Isoyama et al. ............. 228/102 |

FOREIGN PATENT DOCUMENTS

JP 06210470 * 8/1994 ............ 219/121.63

OTHER PUBLICATIONS

"Using Laser Beam Welding in a Continuous Processing Line" Laser Heat Processing Research Journal vol. 4, No. 2, 1997.

* cited by examiner

Primary Examiner—Samuel M. Heinrich
(74) Attorney, Agent, or Firm—Sughrue Mion, PLLC

(57) ABSTRACT

An abutting end portions of the strips are heated from below to a temperature range where annealing effects are obtained by means of a movable heating apparatus which performs high-frequency induction heating and a laser beam (or arc or electron beam) is irradiated from above, at the same speed as that of the movable heating apparatus, to laser beam weld (or arc or electron beam weld) the abutting end portions.

13 Claims, 10 Drawing Sheets

METHOD OF JOINING STRIPS IN A STEEL STRIP CONTINUOUS PROCESSING LINE

BACKGROUND OF THE INVENTION

1. Field of the Invention

The present invention relates to a method of joining steel strips in a steel strip continuous processing line and, in particular, to a strip joining method in which the rear end of an advance strip and the front end of a trailing strip are each cut by means of a shearing machine and then welded at abutting end potions of the strips (by, for example, laser beam welding and the like).

2. Description of the Related Art

Continuous processing is performed in a continuous steel strip processing line in order to improve productivity, stabilize quality, improve the yield of coil ends and the like. In this continuous processing, by welding the rear end of an initially transported coil and the front end of a subsequently passed coil at the entrance of each line, so-called "coil jointing", coils may be continuously transported without stopping the lines. In this case, when welding high carbon steel material, martensitic stainless steels and the like the weld may harden, making weld cracking likely. Moreover, in a rolling line, when there is a difference in hardness between the weld and the base material post-welding annealing is performed because breaking and other problems are likely to occur in production due to deterioration in the mechanical properties thereof.

Next, a laser beam welding machine having a conventional annealing function will be described with reference to FIGS. 11 to 14. Moreover, an outline of the laser beam welding machine having a conventional annealing function explained here is described in page 6 to page 11 of Laser Heat Processing Research Journal VOL. 4, No. 2 1997, "Using Laser Beam Welding in a Continuous Processing Line." Furthermore, FIG. 11 is a schematic explanatory diagram of this laser beam welding machine at the time of welding, FIG. 12 is a drawing of the area where the ends of the strips abut viewed from a direction orthogonal to the running direction of the strips at the time of welding, FIG. 13 is an enlarged drawing at the time of annealing of the area where the ends of the strips abut viewed from a direction orthogonal to the running direction of the strips and FIG. 14 is a pattern diagram of an input heat amount for a strip in the laser beam welding machine.

In FIG. 11, reference numeral 1 denotes strips which in the present specification are generically termed an advance strip 1a and a trailing strip 1b. The strips 1 run in the direction of the arrow A and during welding the abutting end portions of the advance strip 1a and trailing strip 1b are clamped by a clamping apparatus 2. As shown in FIGS. 12 and 13, the clamping apparatus 2 is constructed of upper clamp members 2a and lower clamp members 2b each of which clamp a respective advance strip 1a or trailing strip 1b. A shearing machine 3 used for cutting the strips moves to a line center (the center position along the width direction of the strip) until the strips 1a and 1b are clamped. When the strips 1a and 1b are clamped the ends thereof are cut-off by means of the shearing machine 3. The shearing machine 3 is constructed so as to move in the direction. of the arrow B and retreats to the position shown in FIG. 11 after cutting the rear end of the strip 1a and the front. end of the strip 1b. Meanwhile, the ends of the strips 1a and 1b are abutted. Also, a laser beam from a laser oscillator 4 is guided to a processing head 6 via a bent mirror apparatus 5.

A back-bar 8 and a high-frequency induction heating apparatus 9 are mounted to a back-bar unit 7. As shown in FIG. 12, the back-bar unit 7 is held such that during welding the back-bar 8 is positioned beneath the abutting end portions of the strips 1a and 1b, and during annealing, is switched, rotating from the position in FIG. 12 in the direction of the arrow C so that the high-frequency induction heating apparatus 9 is positioned beneath the abutting end potions of the strips 1a and 1b. Also, after annealing is completed and welding is to be performed again, the back-bar unit 7 is rotated in the direction of arrow D in FIG. 13 to return to the position in FIG. 12.

With the laser beam welding machine having a conventional annealing function such as described above, after the strips 1a and 1b are abutted, the processing head is moved in the direction orthogonal to the running direction A of the strips 1 and a laser beam introduced from the laser oscillator 4 is irradiated on the abutting end potions of the strips 1a and 1b to perform laser beam welding. Moreover, during welding, the back-bar unit 7 is moved to the line center and the back-bar 8 supports the bottom surfaces of the strips 1a and 1b. When laser beam welding is completed in this manner, the back-bar unit 7 rotates to set the high-frequency induction heating apparatus 9 at the bottom surfaces of the strips 1a and 1b, and the entire region of the weld is subjected to heating and annealing.

As is shown in FIG. 14, an example of an annealing pattern at the above time, temperature is raised (in FIG. 14, $t_1$ shows the time during which the temperature is raised) after a certain time to from when welding is completed. Next, a predetermined temperature is maintained for a predetermined time $t_2$ (for example, 600° C.×30 seconds) and then cooling is performed by air-cooling.

Accordingly, in the laser beam welding machine having a conventional annealing function, since, in order for annealing to be carried-out, re-heating is performed from a low temperature several tens of seconds after welding is completed, and since the high-frequency induction heating apparatus 9 is moved after welding, a lot of time is required to anneal the weld.

However, since cycle times are strictly limited in steel continuous processing lines, it is important that strips be joined in a short time and such a development has been eagerly awaited.

SUMMARY OF THE INVENTION

In light of the above circumstances, an object of the present invention is to provide a method of joining strips in a steel strip continuous processing line whereby high-quality butt welding may be performed in short period of time and in a stable manner In order to achieve the above objects, according to one aspect of the present invention there is provided a method of joining strips in a steel strip continuous processing line in which a rear end of an advance strip and a front end of a trailing strip are each cut-off by means of a shearing machine and then welded at abutting end portions of the cut strips, the abutting end portions are heated from below to a temperature range where annealing effects are obtained by means of a movable heating apparatus which performs high-frequency induction heating and the laser beam is irradiated from above, at the same speed as that of the movable heating apparatus, to laser weld the abutting end portions, the abutting end portions being in a high;temperature state due to the heating.

Namely, as the result of intensive study of welding methods in steel strip continuous processing lines, the present inventors discovered a method of welding wherein a high-frequency induction heating apparatus is moved at the same speed as the welding speed of the laser beam. That is to say, they discovered a welding method in which a laser beam for laser beam welding is irradiated to abutting end portions of strips being put into a high temperature state for annealing heating. By welding and annealing in this manner, the welding and annealing time may be greatly shortened. Moreover, even though a laser beam welding machine in a steel continuous processing line normally performs welding at several KW of power output, the quantity of heat consumed in annealing requires several tens of KW power output. Accordingly, since the quantity of heat required for annealing is much greater than that required for welding, the annealing effects are not affected even if laser beam welding energy is output after annealing.

According to another aspect of the present invention, arc welding or electron beam welding may be performed instead of the laser beam welding. In this case, it is also possible to greatly reduce welding and annealing time.

According to yet another aspect of the present invention, a smooth surface may be obtained by crushing the weld bead with a swaging roller.

According to still another aspect of the present invention, a filler wire may be added to the laser beam weld to improve metallurgical properties thereof.

DETAILED DESCRIPTION OF THE PREFERRED EMBODIMENTS

Embodiment 1

Figure 1:
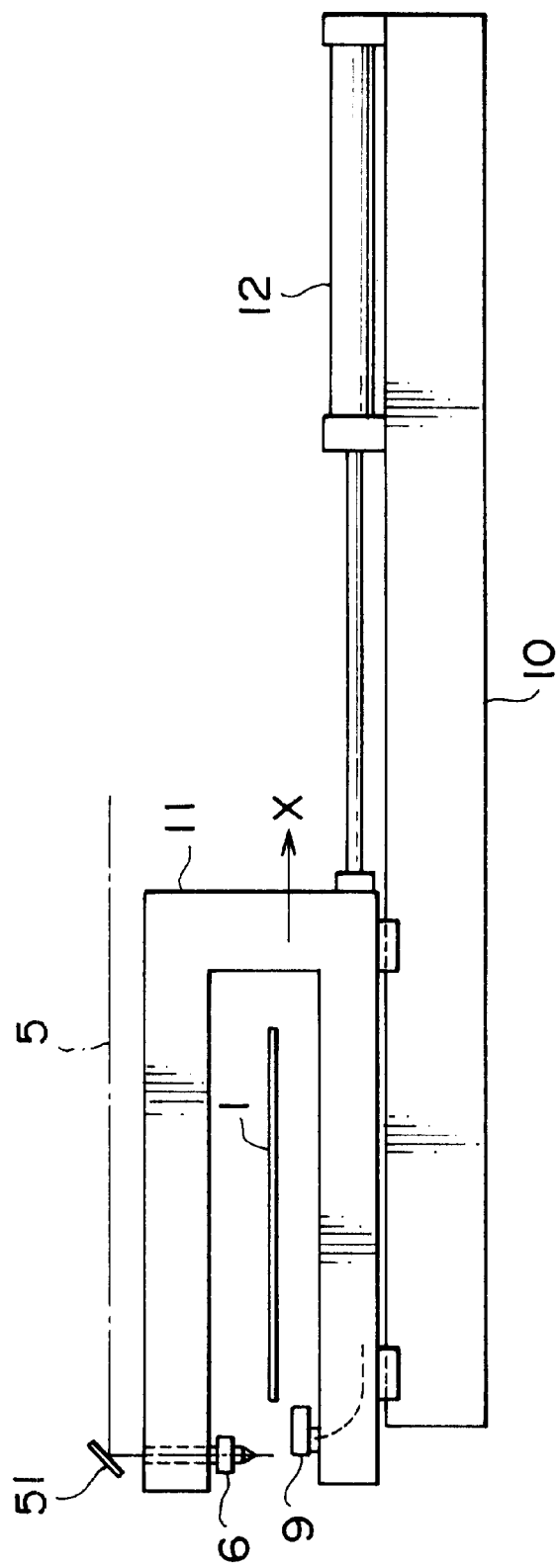
FIG. 1 is a schematic explanatory diagram of embodiment 1 of the present invention.

Next embodiment 1 of the present invention will be described with reference to FIGS. 1 to 8. Moreover, similar reference numerals will be used for portions which are similar to or correspond with those in the related art and the repeat description thereof will be omitted here.

Figure 2:
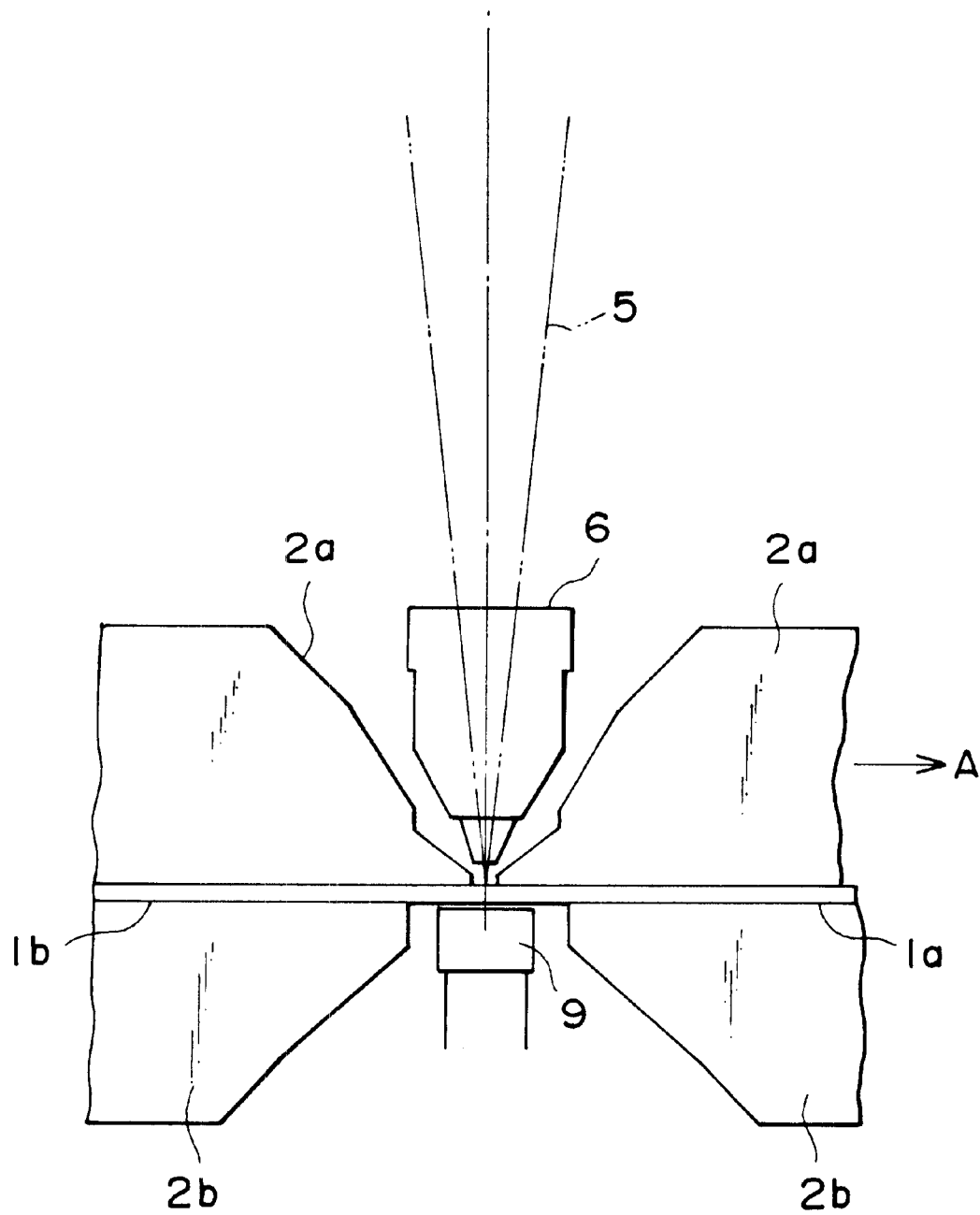
FIG. 2 is an enlarged view of the portion of embodiment 1 shown in FIG. 1 where the ends of the strips abut viewed from the direction orthogonal to the running direction of the strips at the time of welding.

FIG. 1 is a schematic explanatory diagram of embodiment 1 of the present invention. Moreover, FIG. 2 is an enlarged view of the portion in FIG. 1 where ends of strips abut viewed from a direction orthogonal to a running direction of the strips at the time of welding. Furthermore, FIG. 3 is an enlarged view of the portion in FIG. 1 where the ends of the strips abut viewed from the running direction of the strips at the time of welding.

Figure 11:
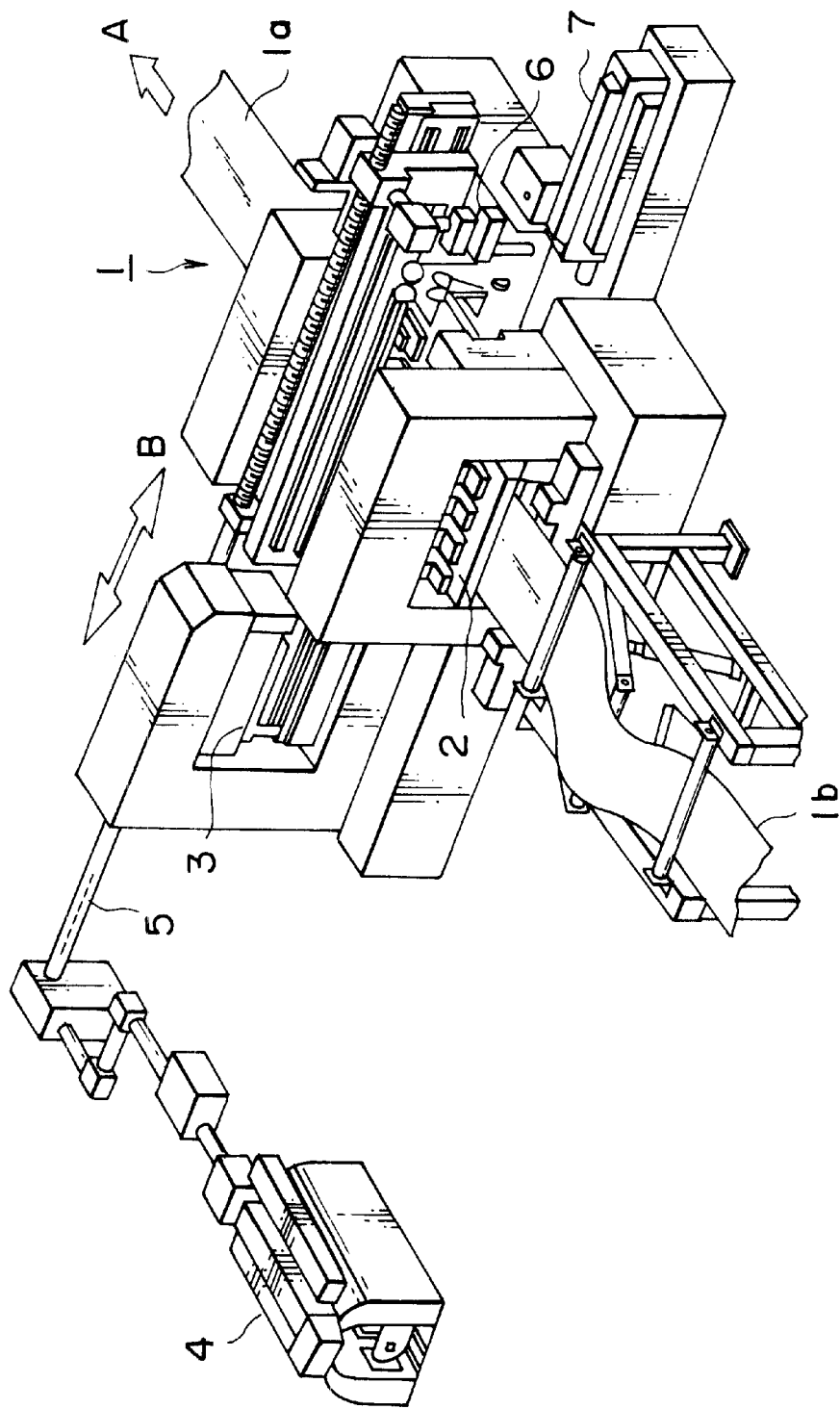
FIG. 11 is a schematic explanatory diagram of a conventional laser beam welding machine at the time of welding.
Figure 12:
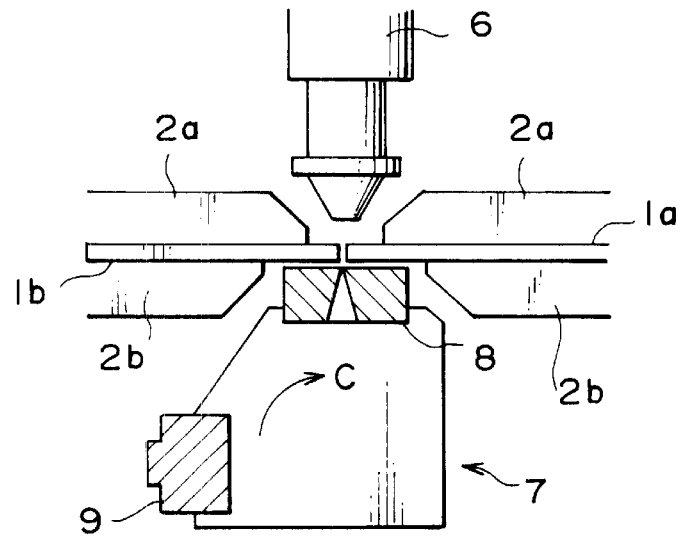
FIG. 12 is an enlarged view of the portion of the conventional laser beam welding machine shown in FIG. 11 where the ends of the strips abut viewed from the direction orthogonal to the running direction of the strips at the time of welding.
Figure 13:
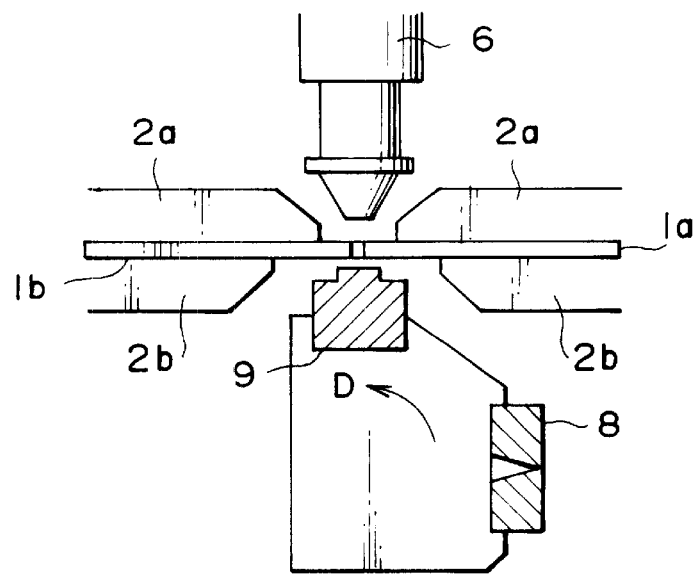
FIG. 13 is an enlarged view of the portion of the conventional laser beam welding machine shown in FIG. 11 where the ends of the strips abut viewed from the running direction of the strips at the time of welding.
Figure 14:
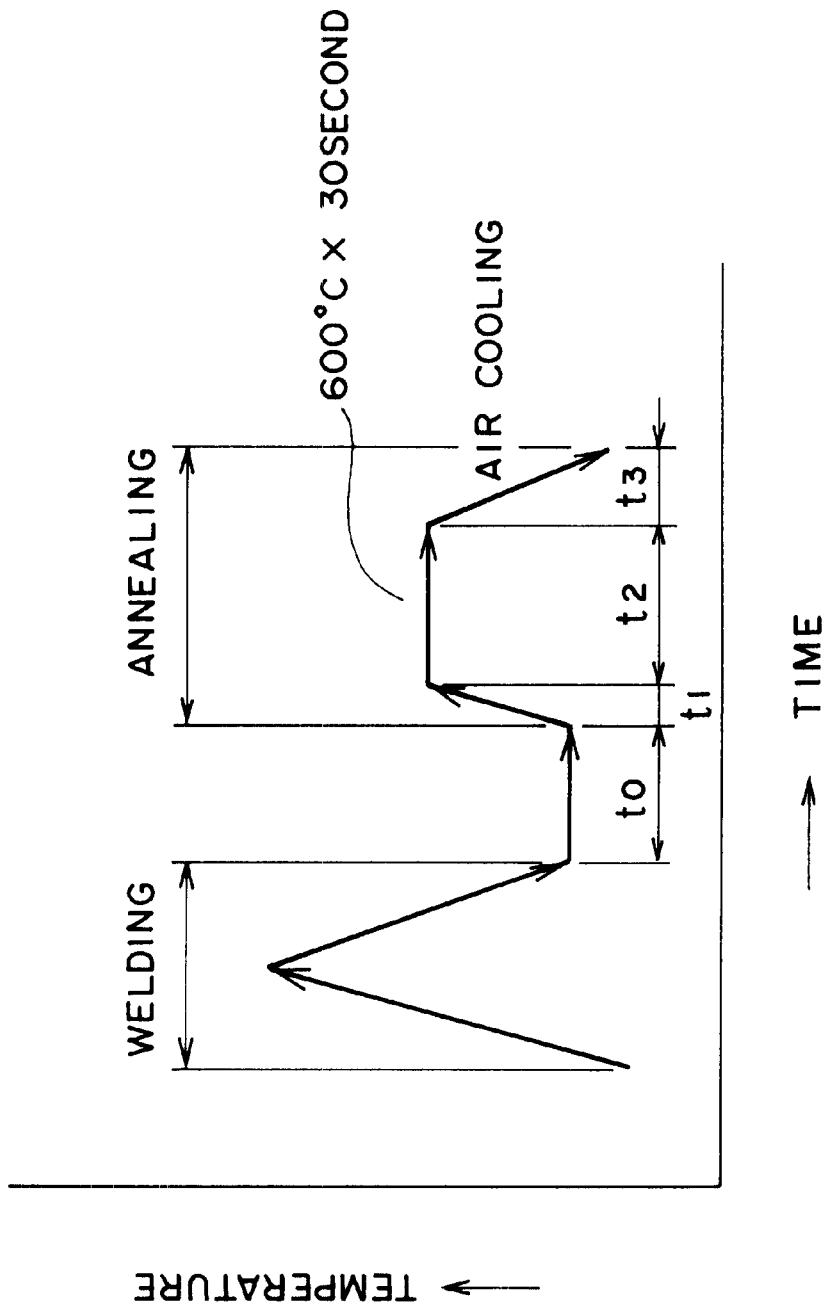
FIG. 14 is a graph showing the temperature change of the abutting end portions of the strip ends in the conventional laser beam welding machine shown in FIG. 11.

In FIG. 1, strip 1, a processing head 6 and a bent mirror apparatus 5 which guides a laser beam from a laser oscillator 4 (which is not shown in FIG. 1, see FIG. 11) to the processing head 6 are similar to conventional equivalents. Also, the processing head 6, a high-frequency induction heating apparatus 9, an upper bent mirror 51 and the like are mounted to a carriage 11 constructed so as to be moved on a common base 10 by means of a driving cylinder 12 in a direction orthogonal to a running direction A of the strips 1. Moreover, in this case, the processing head 6 is disposed so as to be behind the high-frequency induction heating apparatus 9 in a welding direction. This welding direction is in the direction of arrow X in FIG. 1 and orthogonal to the running direction A of the strips 1 in FIG. 2.

Figure 3:
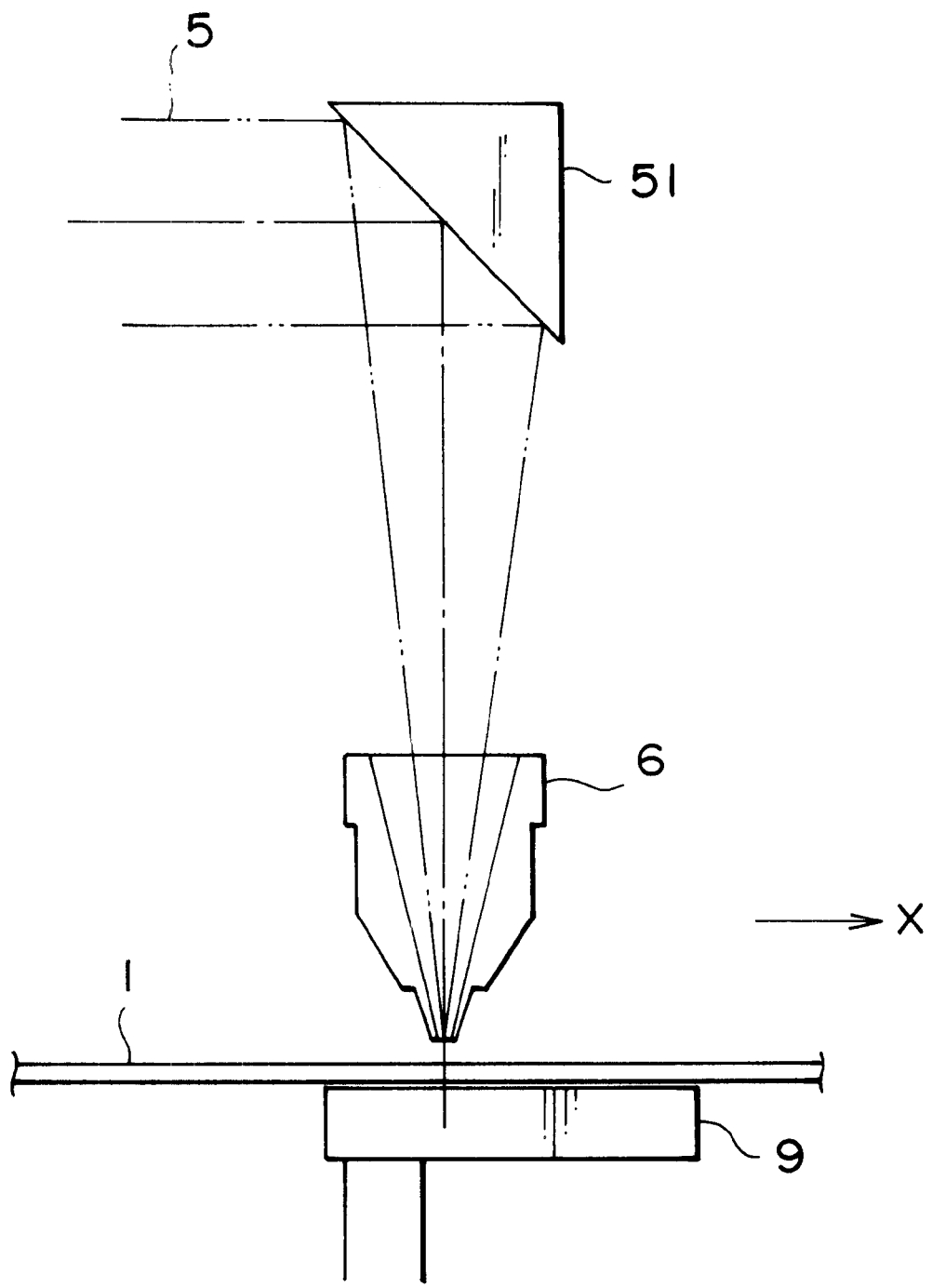
FIG. 3 is an enlarged view of the portion of embodiment 1 shown in FIG. 1 where the ends of the strips abut viewed from the running direction of the strips at the time of welding.

In the apparatus described above, the processing head 6 is disposed above the abutting end portions of the strips 1, as shown in FIGS. 2 and 3. In the other hand, the high-frequency induction heating apparatus 9 is disposed as a movable heating apparatus below the abutting end portions of the strips 1.

Furthermore, as shown in FIG. 2 strips 1*a* and 1*b* are clamped by means of upper and lower clamp members 2*a* and 2*b* during welding, and the rear end of the strip 1*a* and the front end of the strip 1*b* are cut-off with a shearing machine 3 (refer to FIG. 11 as it is similar to a conventional shearing machine) and these ends are welded. As shown in FIG. 2, a gaps are constructed between the upper clamp membera 2*a* so that the processing head 6 and high-frequency induction heating apparatus 9 mounted to the carrier 11 may move simultaneously in the welding direction X. At this time, as stated above, the processing head 6 is disposed so as to be behind the high-frequency induction heating apparatus 9 in the welding direction X.

Accordingly, at the time of welding, the abutting end portions of the strips 1 are first heated by the high-frequency induction heating apparatus 9. Then, a laser beam from the laser oscillator 4 is subsequently guided downward by the upper bent mirror 51 (see FIG. 3) and is irradiated from the process head 6 to a portion to be welded to perform laser beam welding.

Figure 4:
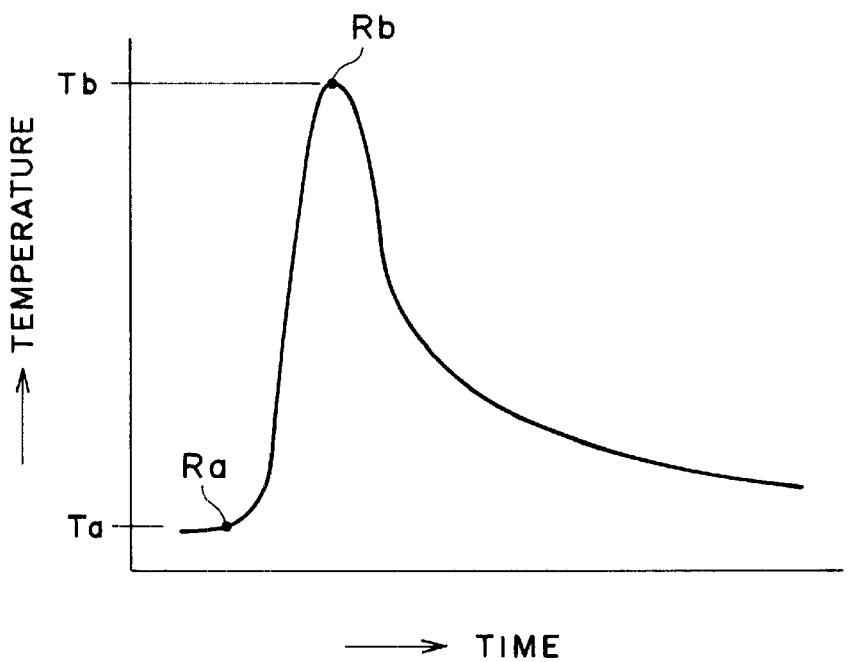
FIG. 4 is a graph showing the temperature change of the area where the ends of the strips abut in embodiment 1.

FIG. 4 shows temperature changes in the abutting end portions of the strips 1 and the abutting portion is heated at a point in time Ra from a room temperature Ta by means of the high-frequency induction heating apparatus 9 and the temperature is raised to roughly an annealing temperature Th (for example, around 1000° C.). Next, the laser beam is irradiated at a point in time Rb and then cooling is performed by air-cooling. Furthermore, the timing difference between Ra and Rb (for example, about 1 second) is brought about by the difference in position of the above processing head 6 and the high-frequency induction heating apparatus 9.

Also, an appropriate annealing temperature at this time depends on the type of steel and since it is necessary to change high-frequency induction heating output on the basis of strip thickness, laser beam output is appropriately controlled based on the type of steel strip flowing down the steel processing line.

Figure 5:
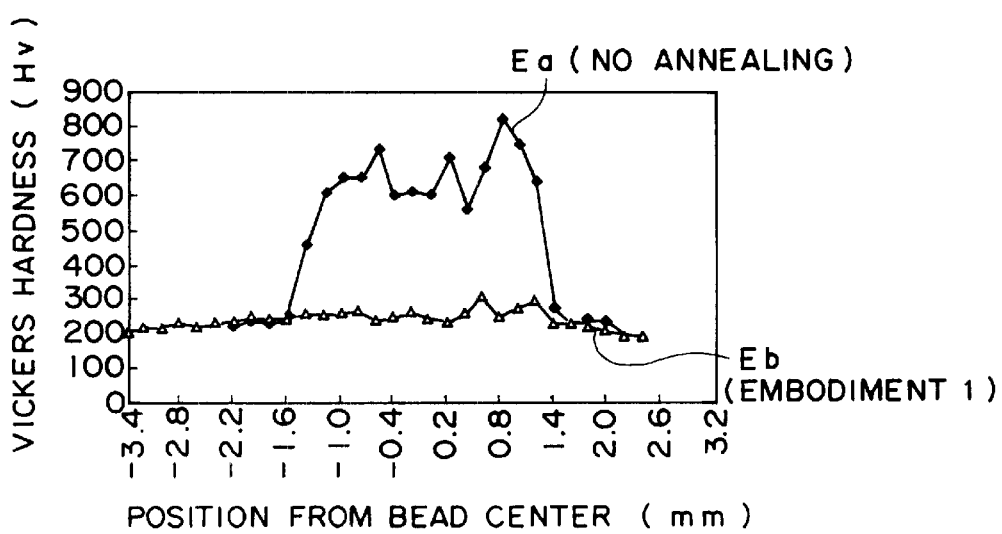
FIG. 5 is a graph according to embodiment 1 showing an example of annealing effects.

FIG. 5 is a graph according to embodiment 1 showing an example of annealing effects and shows how the hardness at the abutting end portions of the strips 1 is improved in the case of embodiment 1 (line Eb) compared to the case where annealing is not performed (line Ea) when S45C is used as the strips 1 and the strip thickness is 3.2 mm. As shown in this figure, when annealing is not performed (line Ea) hardness at a center portion of a bead is much greater than at position away from the center portion of the bead (that is, in the base material). However, in the case of embodiment 1 (line Eb), the hardness of the central portion of the bead and that of the base material are about the same and it is understood that a large improvement can be realized even with a short annealing time by means of the high-frequency induction heating apparatus 9.

Figure 6:
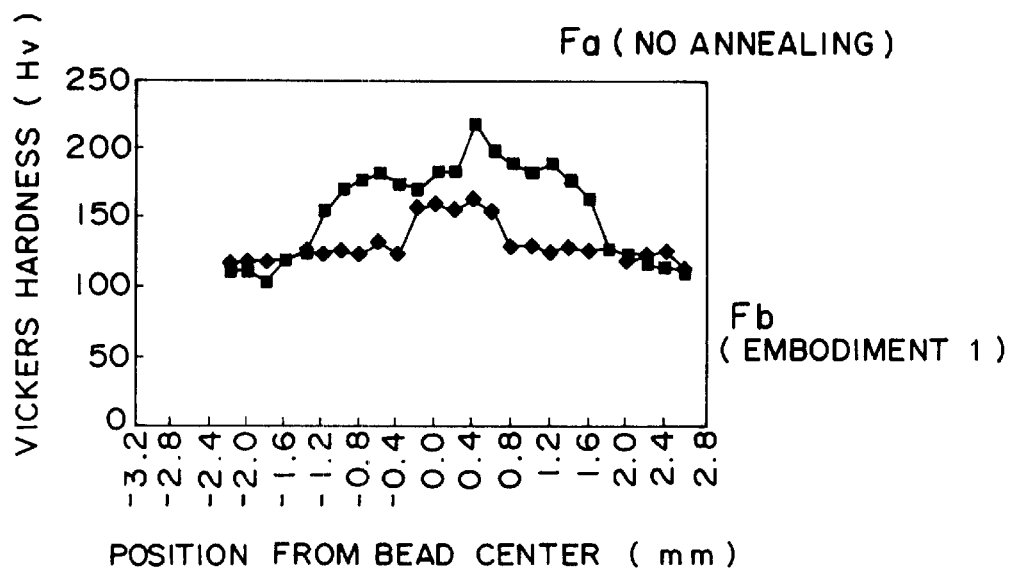
FIG. 6 is another graph according to embodiment 1 showing an example of annealing effects.

From FIG. 6, it can be understood how the hardness at the abutting end portions of the strips 1 is improved in the case of the present embodiment (line Fb) as well as in the case of FIG. 5 compared to the case where annealing is not performed (line Fa) when SPCC is used as the strips 1 and the strip thickness is 3.2 mm. Also, even though good annealing effects are exhibited if annealing is performed for the conventional long period of time, our tests show that there is not a substantial difference between this and the effects of the present invention.

According to the above described method of joining strips of embodiment 1 of the present invention, since annealing is also finished at the point in time when laser beam welding is completed, downtime is shortened.

Also, since the strips 1 are heated to an annealing range before welding and the temperature of the abutting end portions of the strips 1 has already been raised when the laser is irradiated, the amount of heat output by the laser beam is, of course, less than normal. Hence, it is possible to increase the welding speed. Moreover, the welding and annealing times for the abutting end portions of the strips 1 are shortened because the weld is not left to cool for a certain time after welding and then re-heated to the annealing temperature as in conventional examples.

Figure 7:
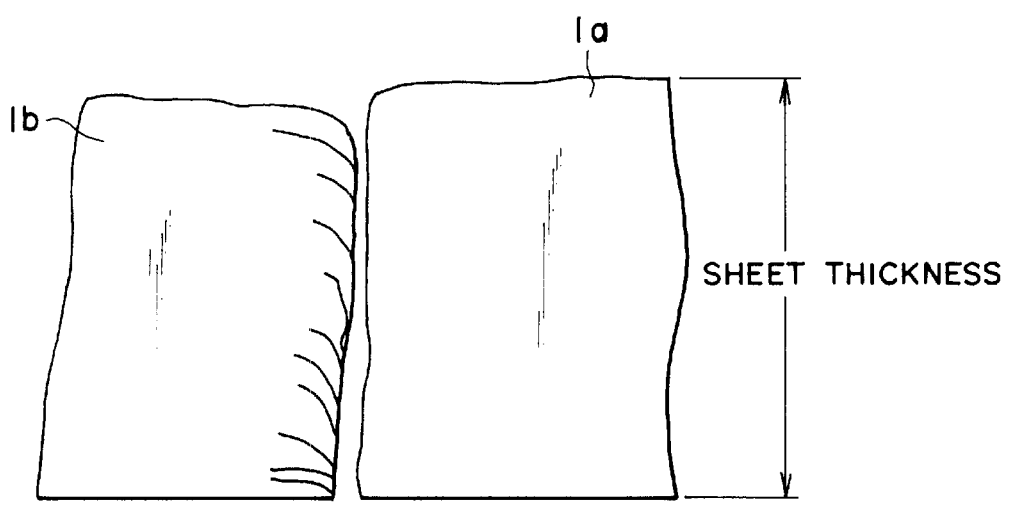
FIG. 7 is an explanatory drawing of the abutting end potions of the strips in embodiment 1, showing the state before heating.
Figure 8:
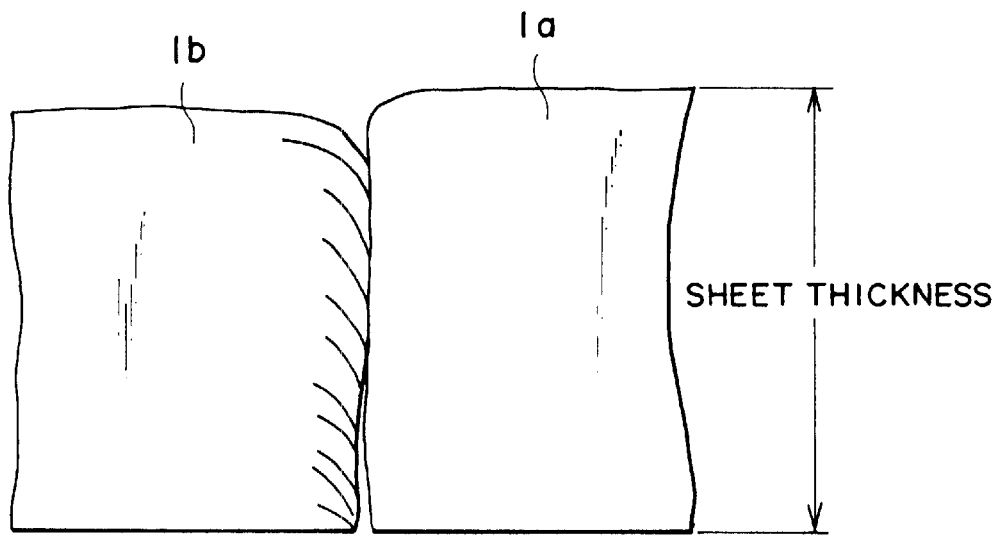
FIG. 8 is an explanatory drawing of the abutting end potions of the strips in embodiment 1, showing the state after heating to the annealing range.

Furthermore, according to embodiment 1 of the present invention an abutting gap at the welding portion is small and hence, it is possible to weld such that it is difficult for burn through to occur. That is, normally the condition of the abutting end portions of the strips 1 after cutting with the shearing machine 3 is such that there are gaps (for example, 0 to 0.1 mm) in places, as shown in FIG. 7. Thus, with conventional welding, burn through or undercut welding is a frequent occurrence. On the other hand, assuming that the temperature of a 20 mm area sandwiching the central portion of the bead (weld line) is raised to 400° C., as in embodiment 1 of the present invention, each strip end 1a and 1b would thermally expand approximately 0.1 mm. In addition to this thermal expansion, since the strips areconstrained by the clamping apparatus 2, the gaps at the abutting portion of the ends of the strips 1 become small, as shown in FIG. 8. Hence, burn through or undercut do not occur and it is possible to perform stable welding.

Embodiment 2

Next, embodiment 2 will be described with reference to FIG. 9. Moreover, portions that are similar or correspond to those in embodiment 1 have similar reference numerals and the repeat description thereof is omitted here.

Figure 9:
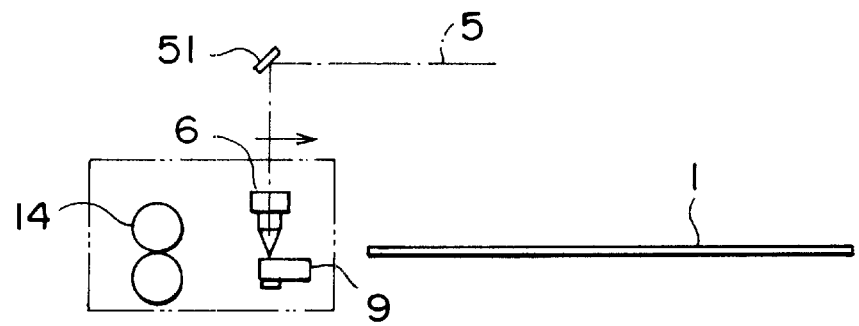
FIG. 9 is a schematic explanatory diagram of embodiment 2 of the present invention.

As shown in FIG. 9, in this embodiment, after welding and annealing according to embodiment 1, the welded portion is crushed by means of a swaging roller 14 so as to smooth the surface thereof. By smoothing the weld in this manner it is possible to prevent excessive force from acting on the boundary between the weld and the base material and to improve the mechanical properties of the weld.

Embodiment 3

Next, embodiment 3 will be described with reference to FIG. 10. Moreover, portions that are similar or correspond to those in embodiment 1 have similar reference numerals and the repeat description thereof is omitted here.

Figure 10:
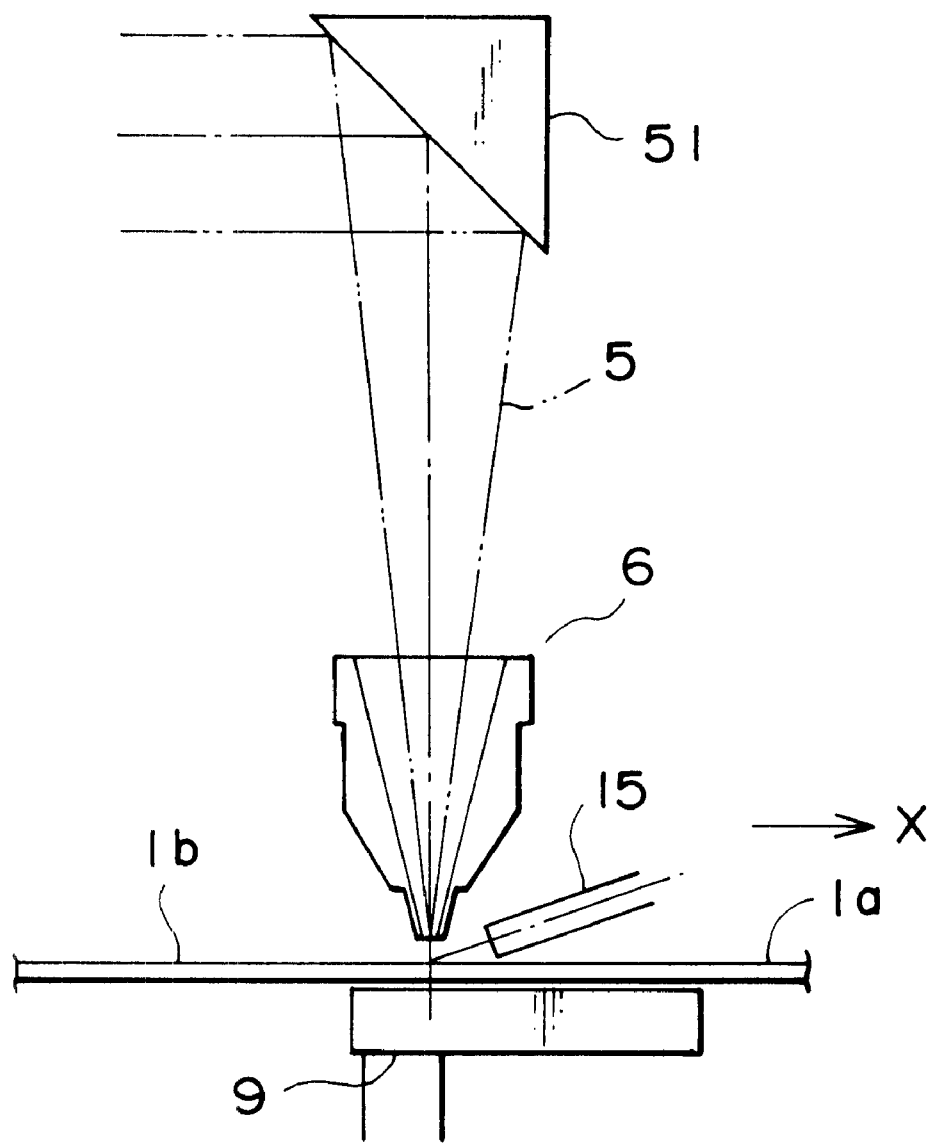
FIG. 10 is a schematic explanatory diagram of embodiment 3 of the present invention.

In this embodiment, as shown in FIG. 10 a filler wire 15 is supplied during welding performed according to embodiment 1. Hence, the weld may be improved from a metallurgical standpoint.

Although in the above mentioned embodiments 1 and 2 welding was performed by laser beam welding, instead of laser beam welding arc welding or electron beam welding may be performed. In this case, while it is, of course, necessary to change the processing head 6 to the respective processing head, irradiating either the arc or electron beam to the abutting end portions of the strips 1 instead of the laser beam may give the same effects as in embodiments 1 and 2.

The present invention provides the following advantageous effects.

According to the present invention there is provided a method of joining strips in a steel strip continuous processing line in which the rear end of an advance strip 1a and the front end of a trailing strip 1b are each cut-off by means of the shearing machine 3 and then welded at abutting end portions of the cut strips 1a, 1b are heated from below to a temperature range where annealing effects are obtained by means of a movable heating apparatus which performs high-frequency induction heating and a laser beam (or an arc or electron beam) is irradiated from above, at the same speed as that of the movable heating apparatus, to laser beam weld (or arc or electron beam weld) the abutting portion, the abutting portion being in a high temperature state due to the heating. Hence, high-quality butt welding may be performed in a short period of time and in a stable manner.

Furthermore, according to the present invention the weld bead is crushed by the swaging roller 14 so as to smooth a surface thereof. Hence, by smoothing the weld bead in this manner it is possible to improve the mechanical properties of the weld.

Moreover, according to the present invention the filler wire 15 is supplied during the above mentioned welding to improve the weld from a metallurgical standpoint. Hence, it is possible to improve the mechanical properties of the weld.

What is claimed is:

1. A method of joining strips in a steel strip continuous processing line in which a rear end of an advance strip and a front end of a trailing strip are each cut-off by means of a shearing machine and then welded at abutting end portions of said cut strips, wherein said abutting end portions are heated from below to a temperature range where annealing effects are obtained by means of a movable heating apparatus which performs high-frequency induction heating and a laser beam is irradiated from above, at the same speed as that of said movable heating apparatus, to laser beam weld said abutting end portions, said abutting end portions being in a high temperature state due to said heating.

2. A method of joining strips in a steel strip continuous processing line according to claim 1 wherein, a resultant welding bead is crushed by a swaging roller after said welding.

3. A method of joining strips in a steel strip continuous processing line according to claim 1, wherein, a filler wire is added when said beam welding is performed to improve metallurgical properties of the weld.

4. A method of joining strips in a steel strip continuous processing line in which a rear end of an advance strip and a front end of a trailing strip are each cut-off by means of a shearing machine and then welded at abutting end portions of said cut strips, wherein said abutting end portions are heated from below to a temperature range where annealing effects are obtained by means of a movable heating apparatus which performs high-frequency induction heating and an arc is irradiated from above, at the same speed as that of said movable heating apparatus, to arc weld said abutting end portions, said abutting end portions being in a high temperature state due to said heating.

5. A method of joining strips in a steel strip continuous processing line according to claim 4 wherein, a resultant welding bead is crushed by a swaging roller after said welding.

6. A method of joining strips in a steel strip continuous processing line in which a rear end of an advance strip and a front end of a trailing strip are each cut-off by means of a shearing machine and then welded at abutting end portions of said cut strips, wherein said abutting end portions are heated from below to a temperature range where annealing effects are obtained by means of a movable heating apparatus which performs high-frequency induction heating and a electron beam is irradiated from above, at the same speed as that of said movable heating apparatus, to electron beam weld said abutting end portions, said abutting end portions being in a high temperature state due to said heating.

7. A method of joining strips in a steel strip continuous processing line according to claim 6 wherein, a resultant welding bead is crushed by a swaging roller after said welding.

8. A method, of joining strips that travel in a running direction in a steel strip continuous processing line in which a rear end of an advance strip and a front end of a trailing strip are welded at abutting end portions, comprising:

heating the abutting end portions of said strips to a temperature range where annealing effects are obtained by way of a movable heating apparatus that performs induction heating;

moving, during said step of heating the abutting end portions, said heating apparatus in a direction oblique to said running direction, to perform said heating of the abutting end portions;

welding said abutting end portions, with a movable welding device;

moving said welding device in a direction which is the same as that in which said heating apparatus is moved, to perform said welding of said abutting end portions, wherein said moving of said welding device is performed during said step of welding said abutting end portions and at a speed similar to that in which said heating apparatus is moved so that said abutting end portions are welded near an annealing temperature state achieved by said heating.

9. The method of joining strips in a steel strip continuous processing line according to claim 8, wherein said welding of said abutting end portions further comprises welding said abutting end portions with a laser beam.

10. The method of joining strips in a steel strip continuous processing line according to claim 8, wherein said welding of said abutting end portions further comprises welding said abutting end portions with an arc.

11. The method of joining strips in a steel strip continuous processing line according to claim 8, wherein said welding of said abutting end portions further comprises welding said abutting end portions with an electron beam.

12. The method of joining strips in a steel strip continuous processing line according to claim 8, further comprising, after said welding, crushing a resultant welding bead with a swaging roller.

13. The method of joining strips in a steel strip continuous processing line according to claim 8, further comprising, during said welding, adding a filler wire so as to improve metallurgical properties of the weld.

* * * * *